United States Patent
Jost et al.

Patent Number: 6,135,493
Date of Patent: Oct. 24, 2000

[54] AIRBAG WITH COMPENSATING VOLUME

[75] Inventors: Stefan Jost, Wiesbaden; Reuter Jörg, Mainz, both of Germany

[73] Assignee: Breed Automotive Technology, Inc., Lakeland, Fla.

[21] Appl. No.: 09/287,471

[22] Filed: Apr. 5, 1999

[30] Foreign Application Priority Data

Jun. 2, 1998 [DE] Germany ............... 198 24 601

[51] Int. Cl.⁷ ..................................... B60R 21/22
[52] U.S. Cl. ............................ 280/730.2; 280/743.1
[58] Field of Search .................. 280/730.2, 730.1, 280/743.1, 743.2, 729

[56] References Cited

U.S. PATENT DOCUMENTS

| | | | |
|---|---|---|---|
| 5,114,180 | 5/1992 | Kami et al. | 280/743.1 |
| 5,529,837 | 6/1996 | Fujiki et al. | 428/266 |
| 5,556,128 | 9/1996 | Sinnhuber et al. | 280/743.1 |
| 5,586,782 | 12/1996 | Zimmerman et al. | 280/743.1 |
| 5,632,914 | 5/1997 | Hagenow et al. | 219/121.71 |
| 5,718,450 | 2/1998 | Hurford et al. | 280/730.2 |
| 5,722,685 | 3/1998 | Eyrainer et al. | 280/730.2 |
| 5,765,863 | 6/1998 | Storey et al. | 280/729 |
| 5,788,270 | 8/1998 | Haland et al. | 280/729 |
| 5,829,779 | 11/1998 | Nakashima et al. | 280/730.2 |

FOREIGN PATENT DOCUMENTS

| | | | |
|---|---|---|---|
| 2944319 | 5/1981 | Germany | 280/743.1 |
| 5-162598 | 6/1993 | Japan | 280/730.2 |

*Primary Examiner*—Paul N. Dickson
*Attorney, Agent, or Firm*—L. R. Drayer

[57] ABSTRACT

The invention relates to an airbag for an airbag module having a first chamber, which can be connected to a gas feeding device, at least one second chamber and a valve device, which makes it possible for gas to flow over from the first chamber into the second chamber only when a predetermined pressure is reached in the first chamber on account of impact of a vehicle occupant with the airbag.

7 Claims, 1 Drawing Sheet

AIRBAG WITH COMPENSATING VOLUME

FIELD OF THE INVENTION

The invention relates to an airbag for an airbag module and in particular for a curtain airbag module.

BACKGROUND OF THE INVENTION

In motor vehicles, airbag modules are often provided at various locations to improve passive safety. These airbag modules have airbags which, in the event of an accident or collision of the vehicle, are filled with a gas via a gas generator. The vehicle occupants are cushioned by these airbags, whereby they are protected from injury on hard or sharp vehicle parts. Upon impact of a vehicle occupant with an airbag, it is important that the airbag has adequate damping properties to be able to absorb the energy of the vehicle occupant with which impact occurs and to retard "slowly" the vehicle occupant with which impact occurs.

To ensure such damping properties of an airbag, the airbags of known airbag modules are often provided with outflow openings or outflow valves. These outflow openings make it possible for the gas to escape in a specifically controlled manner from the airbag into the surroundings upon impact of the vehicle occupant, whereby the internal pressure in the airbag is reduced and the impact of the vehicle occupant with the airbag is damped. Furthermore, it is known to produce the entire airbag, or at least part of the airbag, from a gas-permeable fabric, making it possible for gas to escape through the fabric into the surroundings and consequently for the internal pressure in the airbag to be reduced during the impact of a vehicle occupant.

Recently, use has been made increasingly of airbag modules with which a long deployed time, i.e. a filled state of the airbag lasting as long as possible, is desired. These airbag modules are, in particular, socalled curtain airbag modules, which are arranged laterally in the vehicle in the region of the lateral roof members extending in the longitudinal direction of the vehicle. The airbags of such airbag modules unfold in the event of an accident in the lateral region of the vehicle essentially between the side window and the head of a vehicle occupant. Such an airbag is intended to protect the head of the vehicle occupant, in particular in the case of side impact or else rolling over of the vehicle. In particular in the case of roll over, long deployed times of the inflated airbag are required to make it possible for the vehicle occupants to be adequately protected during the entire rolling over motion of the vehicle. These deployed times are significantly longer than are known, for example, from airbag modules which are arranged in the steering wheel of the vehicle. For this reason, in the case of such airbag modules, the arrangement of the known solutions for providing adequate damping of the inflated airbag are unsatisfactory. The arrangement of outflow openings or the use of gas-permeable fabric leads to a premature escape of the gas from the airbag, as a result of which the deployed time in the inflated state of the airbag is considerably reduced. Even if larger gas generators are used, making it possible to provide a greater volume of gas and consequently replace some of the gas escaping prematurely, an adequately long deployed time of the inflated airbag cannot be achieved. Dispensing with outflow openings leads to a largely gastight airbag. In this way, although adequately long deployed times of the inflated airbag can be achieved, the impact of a vehicle occupant with the airbag is scarcely damped, with the result that the risk of injury to the occupants is greater.

SUMMARY OF THE INVENTION

It is the object of the invention to provide an improved airbag for an airbag module which permits longer deployed times in the inflated state with at the same time good damping properties in the event of impact of a vehicle occupant.

The airbag according to the invention has a first chamber, which, in the event of an accident, is filled with gas by a gas generator. In this state, at least one second chamber of the airbag is separated or divided off from the first chamber in such a way that the second chamber is not initially filled with gas.

If a vehicle occupant then makes impact with the airbag or the first chamber of the airbag, the internal pressure of the gas in this first chamber increases and a valve device opens up a flowpath, which makes it possible for gas to flow over from the first chamber into the second chamber. As a result, the internal pressure in the first chamber can be reduced during the impact of the vehicle occupant with the airbag, whereby the impact is damped. Overall, however, only a volume of gas corresponding to the volume of the second chamber can flow over from the first chamber into the second chamber, until a pressure equalization is established between the two chambers, with the result that the entire gas does not escape from the first chamber. Consequently, damping of the impact of a vehicle occupant with the airbag is possible without opening outflow openings which make it possible for the gas to flow out into the surroundings, which would lead to the gas escaping completely. It is consequently possible to prevent the airbag being emptied completely after the impact of a vehicle occupant with said airbag, beyond the volume of gas required for damping the impact. After the gas has flowed over from the first chamber into the second chamber of the airbag according to the invention, the inflated state of the first chamber is preserved, albeit with reduced internal pressure, with the result that adequate protection is ensured even in the event of further impact of the vehicle occupant. Consequently, much longer deployed times are possible for the inflated state of the airbag, with the result that adequate protection is ensured even in the event of repeated impact of the vehicle occupant.

Furthermore, the second chamber, which fills after the impact of a vehicle occupant with the first chamber, may be arranged in such a way that it can assume an additional protective function. The second chamber may be arranged in such a way that it protects the vehicle occupant from contact with parts of the vehicle or bodywork in the event of further impact with the airbag, and thus further minimizes the risk of injury.

The individual chambers are advantageously of an outwardly gastight design. In this way, extremely long deployed times in the inflated state can be achieved, since no gas can escape from the airbag to the outside. In the event of a collision of a vehicle occupant with the first chamber of the airbag, only a volume of gas corresponding to the volume of the at least one second chamber will escape from the first chamber into the second chamber. Thereafter, a pressure equalization is established between the first chamber and second chamber and further gas cannot escape to the outside from either the first chamber or the entire airbag. In the event that a thermally acting gas generator is used, the airbag will, however, collapse later, on account of the cooling down of the gas introduced at high temperature. In this way, in spite of its gastight design, the airbag then does not represent an additional obstacle during a possible rescue of vehicle occupants.

The valve device is advantageously formed by a tear-open seam. The first chamber and the second chamber are separated by such a tear open seam in such a way that, when the seam tears open, a flow passage is opened up between the first chamber and the second chamber. The tear open seam is designed in the manner of a predetermined breaking location, which tears open when there is a certain force acting on it. Such a force occurs when there is a predetermined internal pressure in the first chamber, caused by the impact of a vehicle occupant. The strength of the tear open seam may be adapted exactly to the desired pressure level according to the type of vehicle and place where the airbag is installed, with the result that it can be ensured that the tear open seam does not open prematurely, for example when the airbag is being filled.

It is further preferred for the valve device to be designed as a restricting location. By appropriate choice of the cross section of the valve device in the opened state, i.e. when the flow path from the first chamber to the second chamber has been opened up, the rate of gas flowing over from the first chamber into the second chamber can be predetermined or set. In this way, it is possible to preset exactly the damping properties of the airbag.

The airbag is preferably able to be fitted in a curtain airbag module in such a way that the first chamber can unfold in the side region of a vehicle to the side of the head of the vehicle occupant, while the second chamber is located above the head. Such an arrangement of the airbag permits optimum protection of the head and shoulder region of a vehicle occupant in the event of side impact or rolling over of the vehicle. Specifically in the case of such an airbag, long deployed times are desired, so that the airbag is inflated during the entire roll over motion in order to protect the vehicle occupant from possible injury. By arranging the second chamber in the overhead region, additional protection can be ensured after the impact of the vehicle occupant with the first chamber by the second chamber, which is then likewise inflated.

It is further preferred for the airbag to consist of a silicone coated or PU-coated fabric. Such a fabric ensures that the airbag is virtually completely gastight, whereby particularly long deployed times of the airbag can be achieved. Furthermore, silicone-coated or PU-coated fabric has the advantage that it can easily be welded. An airbag made up of a number of pieces of fabric can therefore be produced at extremely low cost by welding, for example by ultrasonic welding. Such welded seams have the additional advantage over conventional seams that they can be made absolutely gastight.

It is preferred for the tear open seam to be a welded seam. A tear-open seam designed in this way can likewise be produced at very low cost, in particular whenever the remaining seams of the airbag are also produced by welding. By appropriate selection of the welding depth or the width of the welded seam, the desired tear-properties of the seam can be set exactly, allowing it to be ensured that the valve device between the first chamber and the second chamber reliably opens the flow transfer between the first chamber and the second chamber when there is a certain internal pressure in the first chamber.

It is further preferred for the tear open seam to be an ultrasonically welded seam. An exactly defined welded seam can be formed at very low cost by ultrasonic welding.

DETAILED DESCRIPTION OF THE INVENTION

Figure 1:
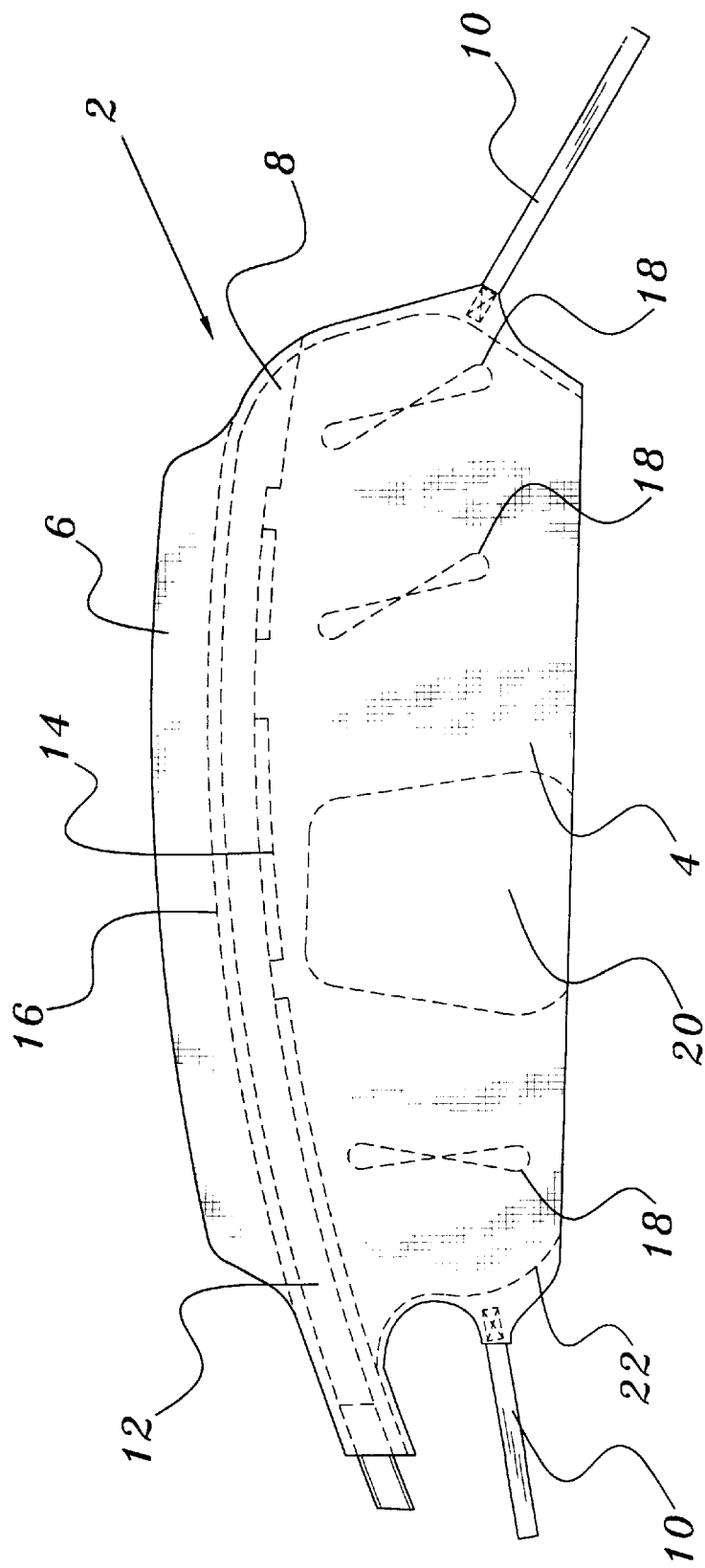

The invention is described by way of example below with reference to the attached drawing. The FIGURE shows a plan view of a curtain airbag module according to the invention.

The airbag 2 shown comprises two chambers 4, 6, of which the first chamber 4 assumes the actual protective function, while the second chamber 6 serves as a compensating volume for damping the impact of a vehicle occupant with a first chamber 4. The airbag 2 shown here is an airbag for a so called curtain airbag module, i.e. it is intended for installation along a lateral roof member extending in the longitudinal direction of the vehicle. For this purpose, the airbag 2 is fastened in the lateral roof region of a vehicle by an upper region 8, which extends above the first air chamber 4 in the longitudinal direction of the airbag In the folded together state, the airbag 2 then lies within the rooflining or between the roof lining and the actual roof panel. In the unfolded, i.e. inflated, state, the first chamber 4 of the airbag 2 extends downward, starting from the vehicle roof above the side windows, so that it is arranged between the vehicle occupants and the vehicle side windows. At the same time, the first chamber 4 of the airbag 2 extends in the longitudinal direction of the vehicle, starting from the A pillar and proceeding to the C pillar of the vehicle. In the region of the lower two corners or ends of the airbag 2, or of the first chamber 4, there is respectively arranged a clamping band 10, by which the airbag 2 is held in its lower region on the A pillar or the C pillar.

Arranged in the upper region 8 is a gas feeding device 12, which is formed by a flexible hose which extends from the rear region of the airbag 2, i.e. the region facing the C pillar, in the longitudinal direction of the vehicle through virtually the entire airbag 2. The hose is held in its position by seams 14, 16, which join to each other the two layers of material or fabric forming the airbag 2. The gas feeding device 12 has gas outlet openings which are uniformly distributed over the entire length of the airbag 2 and permit uniform filling with gas of the airbag 2, or the first chamber 4. A gas generator for generating the required volume of gas is connected in the rear region of the airbag 2, i.e. in the region facing the C pillar, to the gas feeding device 12. Above the upper region 8 with the gas feeding device 12 there extends the second chamber 6 of the airbag 2 parallel to the first chamber 4 in the longitudinal direction of the airbag 2, i.e. in the longitudinal direction of the vehicle. When the airbag 2 is installed in a vehicle, the second chamber 6 is consequently arranged in the region of the roof of the vehicle. The seam 16 separates the first chamber 4 and the second chamber 6 of the airbag 2 from each other. At the same time, the seam 16 is designed at least partially as a tear-open seam, so that it can open and open up a flow passage between the first chamber 4 and the second chamber 6, making it possible for gas to flow over from the first chamber 4 into the second chamber 6.

In the event of an accident, the gas generator of the airbag module is activated and gas is fed to the airbag 2 by the gas feeding device 12. In this case, the gas initially flows into the first chamber 4 and fills it completely, while the second chamber 6 remains divided off in a gastight manner by the seam 16 and consequently is not initially filled with gas. If a vehicle occupant then makes impact with the first chamber 4, the internal pressure in the first chamber 4 increases and the increased force exerted on these seams leads to the tear open seam 16 tearing open, so that a connection between the first chamber 4 and the second chamber 6 is opened up. As a result, gas can flow over from the first chamber 4 into the second chamber 6, the internal pressure in the first chamber 4 being reduced and the impact of the vehicle occupant with the first chamber 4 consequently being damped. During this flowing over, however, only a limited volume of gas can escape from the first chamber 4 until the second chamber 6 is filled in such a way that there is a pressure equilibrium between the two chambers 4, 6. Further gas cannot escape from the first chamber 4, since both the first chamber 4 and the second chamber 6 are designed in a gastight manner toward the outside, i.e. toward the surroundings. Consequently, the first chamber 4 also remains at least partially filled with gas, so that it can still offer adequate protection even if there is further impact of the vehicle occupant. Furthermore, the then filled second chamber 6 can also perform an additional protective function if there is impact of a vehicle occupant with the second chamber 6. By choosing the size of the second chamber 6, the volume of gas which is to escape into the second chamber 6 in the event of impacts of a vehicle occupant with the first chamber 4 can be set exactly, so that the desired damping properties in the event of impact of a vehicle occupant can also be predetermined exactly. In addition, the entire seam 16 does not have to be designed as a tear open seam, it instead also being possible for only partial regions to tear open, so that restricting locations for the gas transfer from the first chamber 4 into the second chamber 6 are formed. These restricting locations slow the transfer of gas from the first chamber 4 into the second chamber 6. Consequently, by suitable choice of the cross section of the restricting locations, the damping properties of the airbag can be additionally influenced, so that an exact adaptation of the damping properties to the respective place of installation or type of vehicle is possible.

The airbag 2 shown here has additionally sealedoff regions 18. These sealed off regions 18 are formed by seams between the two layers of fabric forming the airbag 2, or the first chamber 4, so that regions which are not filled with gas during the filling of the first chamber 4 are created. In this way, the volume of gas required for filling the airbag 2, or the first chamber 4, is reduced, whereby quicker inflation of the airbag 2 and the use of smaller gas generators is made possible. The sealed off regions 18, 20 do not impair the protective function of the airbag 2, since they are either designed to be very small, in the case of the sealed-off regions 18, or are arranged at a position in which impact of a vehicle occupant is not possible, such as the sealed-off region 20. If the airbag 2 is installed in a motor vehicle, the sealed-off region 20 is located in the region of the B pillar or in the region directly next to or behind the head rest of a front seat. In this region, the airbag 2 does not have to offer any protection, since this region is not in the vicinity of a vehicle occupant or the head of a vehicle occupant.

The airbag 2 shown here preferably consists of a silicone-coated or PU-coated synthetic fabric, which offers high tear strength and at the same time is extremely gastight. Furthermore, such a fabric can be processed at very low cost, since all the seams required can be formed by welding a number of layers of fabric. The entire airbag 2 essentially comprises two layers of fabric which are laid one on top of the other and are welded to each other in their peripheral region by a welded seam 22. In addition, the sealed off regions 18, 20 are formed by further welded seams, and the upper region 8, in which the gas feeding device 12 is fitted, is formed by the welded seam 14 and the welded seam 16. In addition, the seam 16 divides off the first chamber 4 and the second chamber 6 from each other in a gastight manner. In this case, however, the seam 16 is designed as a tear open seam, so that it can open when there is a certain internal pressure in the chamber 4 and releases a gas transfer from the first chamber 4 into the second chamber 6. For this purpose, it is possible in particular to vary the seam depth or seam width of the welded seam 16, in order to set the strength of the welded seam 16 exactly such that it opens when there is a certain internal pressure in the chamber 4. All the welded seams shown here can be advantageously made by ultrasonic welding in a very simple and low cost manner. At the same time, a high quality of the welded seams is additionally achieved, so that it can also be ensured that the welded seams are adequately gastight. However, the tear open seam provided on the airbag 2 shown here does not necessarily have to be made as a welded seam, it may likewise be designed as a normal, sewn seam.

The airbag 2 described above with reference to the FIG. 1s designed as an airbag 2 for a so-called curtain airbag module, but the arrangement according to the invention of two chambers may also be used in airbags for other airbag modules. For example, the airbag according to the invention may also be used for airbag modules such are arranged in the region of the dashboard, the steering wheel or the doors of a vehicle. Use is appropriate wherever a long deployed time of the gas-filled airbag is desired in addition to good damping properties of the airbag. In the event that a maximum deployed time of the filled airbag is not required and an escape of gas into the surroundings over an extended period of time is desired, additional outflow openings or valves may also be provided in the case of the airbag according to the invention, in particular in the second chamber.

What is claimed is:

1. A curtain airbag for an airbag module comprising
   (a) a first chamber having an outwardly gastight design,
   (b) a gas feeding device capable of substantially distributing gas over the length of the first chamber.
   (c) at least one second chamber having an outwardly gastight design.
   (d) at least one sealed-off region positioned in a portion of the first chamber where impact by an occupant is not possible, and
   (e) a valve device formed by a tear-open seam, which makes it possible for gas to flow over from the first chamber into the second chamber only when a predetermined pressure is reached in the first chamber on account of impact of a vehicle occupant with the airbag.

2. The airbag curtain as claimed in claim 1 where the valve device is designed as a restricting location.

3. The airbag curtain as claimed in claim 1 which can be fitted in a curtain airbag module in such a way that the first chamber can unfold in the side region of a vehicle to the side of the head of the vehicle occupant, while the second chamber is located above the head.

4. The airbag curtain as claimed in claim 3 which can be fitted in a curtain airbag module in such a way that the first chamber can unfold in the side region of a vehicle to the side of the head of the vehicle occupant, while the second chamber is located above the head.

5. The airbag curtain as claimed in claim 1 comprising a silicone-coated or PU-coated fabric.

6. The airbag curtain as claimed in claim 1 wherein the tear-open seam is a welded seam.

7. The airbag curtain as claimed in claim 4 wherein the tear-open seam is an ultrasonically welded seam.

* * * * *